United States Patent [19]

Bishop

[11] 4,051,630
[45] Oct. 4, 1977

[54] SOIL TREATMENT COMPOSITIONS

[75] Inventor: Richard Timothy Bishop, Durban, Natal, South Africa

[73] Assignee: Revertex (South Africa) (Proprietary) Limited, Jacobs, Natal, South Africa

[21] Appl. No.: 638,166

[22] Filed: Dec. 5, 1975

[30] Foreign Application Priority Data

Dec. 30, 1947 South Africa .................. 74/8240
July 4, 1975 South Africa .................. 75/4296

[51] Int. Cl.² .............................................. E02D 3/12
[52] U.S. Cl. .............................. 47/58; 47/DIG. 10; 111/1
[58] Field of Search .............. 47/1, 9, 58, DIG. 10; 166/295; 61/36; 260/41; 106/287 SS; 111/1

[56] References Cited

U.S. PATENT DOCUMENTS

| | | | |
|---|---|---|---|
| 2,625,471 | 1/1953 | Mowry et al. | 47/DIG. 10 |
| 2,703,276 | 3/1955 | Hedrick et al. | 47/1 X |
| 2,754,623 | 7/1956 | Mowry et al. | 47/1 |
| 2,759,902 | 8/1956 | Claudi-Magnussen et al. | 47/1 X |
| 2,856,380 | 10/1958 | Roth et al. | 47/1 X |
| 2,961,799 | 11/1960 | Coe | 47/9 |
| 3,077,054 | 2/1963 | Niemeijer | 47/9 |
| 3,545,130 | 12/1970 | Strother et al. | 47/58 |
| 3,633,310 | 1/1972 | Sandiford | 47/58 |
| 3,759,197 | 9/1973 | Bracke | 47/DIG. 10 |

Primary Examiner—Robert E. Bagwill
Attorney, Agent, or Firm—Young & Thompson

[57] ABSTRACT

This invention provides a method of treating sand or soil to condition it so as to improve its water retention for the germination of seeds, the method comprising applying to the sand or soil a polymer composition in a sufficient amount to provide from about 0.01 to about 0.5 parts of polymer to 100 parts of sand or soil, the amount being determined to ensure that the individual particles or groups of particles of the sand or soil are rendered non-wetting and that the particles retain the non-wetting properties even when they are not aggregated but are free-flowing.

5 Claims, No Drawings

SOIL TREATMENT COMPOSITIONS

This invention relates to sand or soil conditioning and it is an object of the invention to provide a method for conditioning sand or soil which is economical and which results in substantial advantages, for example, in respect of water retention for the germination of seeds, and the growth of seedlings, cutting and the like.

According to the invention a method of treating sand or soil includes the step of applying thereto a composition including a polymer in an amount to provide from about 0.01 to about 0.5 parts polymer to 100 parts of sand or soil, the amount being determined to ensure that the individual particles or groups of particles of the sand or soil are rendered non-wetting even if they remain free-flowing.

In a preferred form of the invention the polymer is applied by way of an emulsion, suspension or solution to the sand or soil, mixed, and then the sand or soil is dried.

It will be appreciated that different types of sand or soil will require greater or lesser amounts of polymer emulsion, suspension or solution in order to ensure complete saturation of the particles thereof and the amount of polymer can easily be determined by simple trial and error.

The particles are visually indistinguishable from the untreated particles but the effect of the treatment will become apparent when the particles are moistened — the untreated particles are wetted whereas the treated particles are not. Thus the treated particles are extremely useful to form a barrier in a furrow, depression or the like in which seeds are germinating or small plants are growing, so that moisture is substantially retained in the furrow or depression.

The non-wetting effect can be nullified by treating with a surfactant, wetting agent or a high concentration of soluble salts.

According further to the invention a product is provided which consists of particles or groups of particles of sand or soil which are treated with a polymer composition as described above, and dried. The product may be marketed as an aid to plant growth.

The consistency of a layer of treated sand or soil can be chosen so that plant roots can easily penetrate through it. In addition vapors and gases can easily escape through the layer while liquids only pass with difficulty.

The polymers useful in the invention are preferably those which are water-insoluble or only slightly soluble. Polymers found particularly useful in the invention include the following copolymers:

vinylacetate/vinyl ester of versatic acid (Veova) (shell);
vinylacetate/2-ethylhexylacrylate;
vinyl acetate/butyl acrylate;
methyl methacrylate/2-ethylhexylacrylate; and
styrene/2-ethylhexylacrylate.

The compositions of the invention preferably contain about 0.1 percent by weight of the polymer and are applied to the soil at the rate of 20 percent by weight.

In general the sand or soil particles have an upper size limit of about 700 microns and a lower limit of about 10 microns. Thus sands or soils containing clay as impurities are also treatable by the present invention.

Further according to the invention one or more soil nutrients such as fertilizers may be added. The plant nutrients are released at a rate dependent on the permeability of the treated sand or soil and the length of time they are in contact with water. Selective blending of the materials can ensure accurately controlled release of the plant nutrients due to controlled water penetration.

When sand which had previously been saturated with a styrene acrylic copolymer emulsion at 0.1 percent and then dried was dry blended with a mixed inorganic fertilizer in a 8:1 ratio, the blend was shown to be water repellant. The rate of loss of fertilizer from this blend after burying in sand and leaching with water was shown to be considerably slower than the losses from standard fertilizer.

The following examples illustrate the invention:

EXAMPLE 1

Four treatments were applied in an experiment with sugar cane:

Treatment A.
(Control)
Furrows were prepared as normal within the industry and left open for two weeks.

Treatment B.
Furrows were prepared as in Treatment (A) which were immediately sprayed with a methyl methacrylate-2 ethylhexylacrylate copolymer emulsion containing 0.2% polymer. The furrows were then left open to air dry for two weeks.

Treatment C.
Furrows were prepared and treated as in Treatment (B), but without the air-drying period.

Treatment D.
Furrows were prepared as in Treatment (A) but were widened to include half the interrows. These widened furrows were lined with dry marine sand pretreated with the same polymer and levels used in Treatment (B) and forced dried at 55° C.

The above treatments were arranged in such a manner that on completion they were all refilled with normal soil and planted with sugar cane settes at the same time.

Shoot counts taken eight weeks after planting showed that Treatment D gave a 49% increase over Treatment A (Control), Treatment B a 37% increase, and Treatment C an 18% increase.

EXAMPLE 2

Ordinary marine sand was sieved through a 710 micron mesh sieve. Of that fraction passing through, briquettes were made using, in the first instance, 150g of sand and 30ml of a polyvinylacetate (PVAc) homopolymer emulsion containing 0.3g of polymer, 0.3g of urea and 0.2g of potassium chloride and in the second instance the PVAc was replaced with an equivalent amount of styrene-2 ethylhexylacrylate (styrene-acrylate copolymer-dextrine blend (40-60)) previously shown to impart the water repellant phenomena to sand particles.

After 17 hours' soaking under water the PVAc containing briquettes had taken up water to 29.8% of their original dry weight whereas the styrene acrylic-dextrine containing briquettes had only taken up 9.6% water.

Subsequent leaching tests confirmed that the styrene acrylic copolymer-dextrine blend could reduce fertilizer losses by up to 54%. At much higher fertilizer levels, the surface tension effect was lost and there was no significant restraint on leaching losses.

EXAMPLE 3

Ordinary marine sand was sieved through a 710 micron mesh sieve. Of that fraction passing through the sieve 150 kg was thoroughly mixed with 30 kg of a vinylacetate-vinyl ester of versatic acid copolymer emulsion containing 0.03 kg of polymer. The wet mass was thoroughly dried at 60° C and then the loose sand poured around fertilizer granules of 2-3-2 (22) in different ways in pots half filled with ordinary beach sand. The treatments were as follows:

Treatment A.
 Control with sand only and no fertilizer.
Treatment B.
 Control with sand and 5g of fertilizer.
Treatment C.
 Ordinary sand with barrier of waterproof sand placed under 5g of fertilizer. Ordinary sand poured in above.
Treatment D.
 Ordinary sand with barrier of waterproof sand placed over 5g of fertilizer. Ordinary sand poured in above.
Treatment E.
 5g of fertilizer put in nonwoven bags and then surrounded by bags containing loose waterproof sand. These buried in ordinary sand.

Maize seeds were planted in the pots and watered regularly. The degree of soluble salts being washed out of the pots was measured in micromhos $\times 10^3$ per cc. After four waterings the total dissolved salts recorded were 677, 3 043, 2 288, 2 514 and 3 986 micromhos $\times 10^3$ respectively for Treatments (A), (B), (C), (D) and (E).

The reduction in fertilizer losses of Treatments C and D over the control treatment B are statistically significant.

The seeds in each pot germinated. Those in pots with Treatments (A), (B) and (E) grew rapidly initially but these became withered and pale in color indicating lack of nutrient. The seeds in pots given Treatment (C) and (D) grew more slowly at first but maintained their growth rate and healthy appearance long after the others had died.

EXAMPLE 4

Ordinary marine sand was sieved through a 250 micron mesh sieve. Of that fraction passing through the sieve 150 kg were thoroughly mixed with 30 kg of a styrene-2 ethylhexylacrylate copolymer emulsion containing 0,03 kg of polymer and the damp mass was then thoroughly dried at 70° C.

After the water repellency effect of the free flowing treated sand was confirmed, three treatments were carried out:

Treatment A.
 Pieces of clean mild steel plate were buried in 10 kg of ordinary sand.
Treatment B.
 Pieces of clean mild steel plate were buried in 2 kg of the treated loose sand and this surrounded by 8 kg of ordinary sand.
Treatment C.
 The treated loose sand was slurried with a polyvinyl acetate (PVAc) homopolymer emulsion at 2% polymer content.
 Pieces of clean mild steel plate were coated to a thickness of 5mm with this slurried sand and then the product was allowed to dry at ambient temperature. When dry the coated metal panels were buried in untreated marine sand.

The above treatments were subjected to alternate wetting and drying for 2 weeks after which time the steel panels were removed from the sand and inspected. Unlike the very badly corroded plates in Treatment (A), the plates in Treatment (B) showed virtually no sign of corrosion. The plates in Treatment (C) showed mild "flash rusting" due to the initial contact with water when the treated aggregated sand was applied.

The above experiment indicates that the waterproof sand can considerably reduce corrosion. If aggregated layers are to be applied then the metal should be pre-primed to prevent flash rusting.

EXAMPLE 5

A styrene-2 ethylhexylacrylate copolymer emulsion was diluted with water to give a 0,1% polymer content. Marine sand (100g) was mixed with 30g of this dilute emulsion and the mass then dried at 55° C.

When dry water repellancy of the treated sand was confirmed before blending 200g of this sand with 25g of a mixed inorganic fertilizer.

200g of ordinary marine sand was dry mixed with 25g of the same fertilizer as a Control treatment.

The above fertilizer-containing sands were buried in a mass of ordinary marine sand and excessive water was then poured onto the surface. The amounts of fertilizer being washed out of the different treatments with successive leachings were measured as electrical conductivity. The results were as follows:

|  | Electrical conductivity (micromhos per cc $\times 10^3$) | | | | |
| --- | --- | --- | --- | --- | --- |
|  | Leach 1 | Leach 2 | Leach 3 | Leach 4 | Leach 5 |
| Fertilizer in ordinary sand | 1500 | 1240 | 138 | 110 | 60 |
| Fertilizer in pre-treated sand | 239 | 980 | 910 | 510 | 300 |

That the pre-treated sand has reduced the rate of fertilizer loss is noted in that after two leachings, the amount of fertilizer removed is 44.5% less than for the control treatment.

EXAMPLE 6

In order to check whether free-flowing polymer-treated sand has any restrictive influence on the movement of water vapor as well as on the movement of water as liquid, the following experiment was conducted :

10 containers were filled with 200g of dry marine sand and then 30g of water was poured onto the surface of each. To five of the containers 20g of ordinary sand was sprinkled over the wet surface, while with the other five containers 20g of polymer-treated sand was sprinkled on. The polymer-treated sand was prepared by slurrying dry marine sand with styrene-2 ethylhexylacrylate copolymer emulsion at 0.1% total solids content and then thoroughly dried at 70° C.

The 10 containers were then weighed and left in a constant temperature/humidity room at 19° C at 50 percent relative humidity. The average loss in containers' weights with time were as follows:

|  | 24 hours | 72 hours | 96 hours | 108 hours |
|---|---|---|---|---|
| Treatment with sand covering | 14.7g | 27.9g | 29.5g | 29.7g |
| Treatment with polymer - sand covering | 7.7g | 21.9g | 25.8g | 27.4g |
| Moisture loss reduction (as percentage of control) | 52.4% | 78.5% | 87.5% | 92.2% |

There has been a considerable reduction in the moisture loss where the polymer-treated sand was used. This indicates that the treated sand has restricted the movement of water vapor through it, which will have important applications in reducing evaporation.

I claim:

1. A method of treating sand or soil having a particle size in the range of about 10 microns to about 700 microns, including the step of applying thereto a composition including a water-insoluble copolymer selected from the group consisting of vinylacetate/vinyl ester of versatic acid, vinylacetate/2-ethylhexylacrylate, vinly acetate/butyl acrylate, methyl methacrylate/2-ethylhexylacrylate, and styrene/2-ethylhexylacrylate in an amount to provide about 0.02 part of copolymer to 100 parts of sand or soil, whereby the individual particles or groups of particles of the sand or soil are rendered non-wetting and the particles retain the non-wetting properties even when they are not aggregated but are free flowing.

2. The method of claim 1 which the polymer is applied by way of emulsion, suspension or solution and the mixture is mixed and dried.

3. A product comprising sand or soil having a particle size in the range of about 10 microns to about 700 microns, coated with about 0.02% by weight of a water-insoluble copolymer selected from the group consisting of vinylacetate/vinyl ester of versatic acid, vinylacetate/2-ethylhexylacrylate, vinyl acetate/butyl acrylate, methyl methacrylate/2-ethylhexylacrylate, and styrene/2-ethylhexylacrylate, the particles being non-wetted by water and are free flowing.

4. The product of claim 3 which also includes an amount of one or more plant nutrients.

5. A method of enhancing germination or plant growth including the step of locating a product according to claim 3 in a depression, filling the depression with sand or soil and locating a seed or plant therein.

* * * * *